UNITED STATES PATENT OFFICE.

WILLIAM GRISCOM, JR., OF BOUND BROOK, NEW JERSEY, ASSIGNOR TO THE STANDARD PAINT COMPANY, OF NEW YORK, N. Y.

VULCANIZABLE COMPOUND.

SPECIFICATION forming part of Letters Patent No. 529,728, dated November 27, 1894.

Application filed March 11, 1891. Serial No. 384,644. (No specimens.)

*To all whom it may concern:*

Be it known that I, WILLIAM GRISCOM, Jr., of Bound Brook, in the county of Somerset and State of New Jersey, have invented a certain new and useful Vulcanizable Compound; and I do hereby declare that the following specification is a clear, true, and complete description of my invention.

In a contemporaneous application for Letters Patent (see Serial No. 384,643, filed March 11, 1891) I have disclosed a novel vulcanizable compound, based upon what I believe to be my own discovery, that animal fat candle tar in its various forms, when properly combined with sulphur, forms a specially valuable vulcanizable compound, which under proper exposure to heat, develops into an elastic mass. My aforesaid elastic compound, although comparatively low in tenacity, possesses much value for certain purposes.

It is to be understood, that animal fat candle tars, are separate and distinct, from the residuum pitches, incident to the distillation of vegetable oils; and that I have discovered that the use of animal fat candle tar, in vulcanizable, and vulcanized compounds, enables them to resist, to a highly valuable degree, the action of acids, &c., and also to successfully resist oxidation for a long time, as when exposed in the open air.

It is well known that the use of caoutchouc or rubber as an elastic agent will always afford the best vulcanized elastic compounds, but its high cost, practically precludes its use in many connections, wherein comparatively inexpensive elastic compounds are greatly needed, and hence I have sought to develop in elastic vulcanizable compounds containing animal fat candle tar and sulphur, desirable degrees of elasticity, tenacity, and solidity, and to enable them to serve as practically valuable substitutes, for the more expensive rubber compounds in many lines of service.

I have now succeeded in producing a compound, which is specially resilient, and tenacious, and instead of increasing the cost, as compared with a compound containing only the prime elements, animal fat candle tar and sulphur, I have greatly reduced its cost, and adapted it to service in many connections, as an effective substitute for the well known expensive vulcanizable rubber, or gum compounds.

For the purpose of this specification, it should be understood, that animal fat candle tar in various forms, is a residual product from the distillation of animal fats, oils, &c., and that it varies somewhat in its character, in accordance with variations in the several modes of treatment, and processes of distillation, well known to and practiced by candle makers. In one form, animal fat candle tar is normally soft, and ropy, and in another form, it is normally quite hard and even friable, these fairly indicating its two extremes, various other intervening forms, occupying a graded scale, between those referred to. All of these forms, may be used for producing my compound, but the best results will accrue from the use of the soft and ropy forms of animal fat candle tar resulting from steam distillation, and without the use of acids, &c. The very hardest forms may however be readily approximated into a desirable condition, when tempered by their admixture, under proper heat, with the softer forms, and also by the use therewith of the heavy liquid distillates, which are evolved next preceding the discharge of the residual product, from the distilling apparatus. The proportion of sulphur, to the animal fat candle tar, must of necessity be varied, according to the desired character of the resulting compound. In the most approved method of compounding the sulphur, and animal fat candle tar, with or without, other plastic matter, the sulphur is melted before its union with the candle tar, which is also then highly heated, this operation being wholly unlike the heretofore compounding of powdered sulphur with rubber, and then heating the mass to a vulcanizing temperature, although under some circumstances this latter method is also employed by me.

My improved vulcanizable compound which constitutes the subject of this application, contains animal fat candle tar and sulphur, and in its best form those bodies are combined with the hard or comparatively hard residual products from the distillation of petroleum, and inasmuch as said products vary in accordance with various methods of distillation, and are variously designated, I can only say that I have found none of said products which would not afford fairly good results in this connection, but that the very best results will accrue from the use of those forms which are normally hard, and are friable under temperatures say at or below 70° Fahrenheit, and which require a comparatively high temperature, say at or above 250° Fahrenheit, for reducing them to a properly liquefied or suitable condition for my purposes. Refined sulphur is preferred, but the cruder forms thereof may be employed.

I have produced my compound in many forms, varied because of different proportions, and also because of the many variations in the character of the animal fat candle tar and the petroleum residuum, and in view of these, I will state that I have in some cases used ninety parts of such candle tar with ten of the petroleum residuum, and I have reversed these proportions, and tested many intermediate variations with sulphur, in from five to fifteen per cent. of the mass. As a rule the animal fat candle tar and petroleum residuum should be equal in quantity, when both are exactly suited to each other, and about six per cent. of the weight of the mass, will indicate the proper proportion of sulphur. With the two main elements of corresponding equal fitness, and with the said candle tar in less proportion, than that indicated, the resulting compound will be liable to be weak, and below a desirable standard, and if the said candle tar be in excess, the character of the compound will not be sufficiently improved, for most purposes, to warrant the additional cost, although for some purposes I employ the said comparatively expensive candle tar, in as high a proportion as from seventy-five to eighty-five per cent. of the mass.

In producing my compound, in a form adapted to a wide range of use, I proceed as follows: Forty-seven pounds each of animal fat candle tar, in its soft and ropy form, and petroleum residuum in its hard form, friable at say 64° Fahrenheit, are placed in a suitable steam jacketed kettle, and reduced to a well liquefied condition under a temperature of about 300° Fahrenheit. Six pounds of sulphur, previously melted, are then poured into the kettle, and well mixed with the other elements, the temperature being meantime, say during about thirty minutes, slowly raised to about 345° Fahrenheit. During the latter part of this period the mass will foam freely under the evolution of gases, whereupon the temperature is raised as rapidly as may be practicable, to a temperature of say 380° or 390° Fahrenheit. In due time, a subsidence of the foam will occur, and this will indicate the close of the vulcanization process. If lower temperatures must be employed, a longer time will be involved in the operation.

If the vulcanized compound is to be developed in bulk, it is allowed to cool, and then cut into suitable blocks or lumps; but if it is to be incorporated with, or applied as a coating, or molded, it should be promptly worked during its still heated and plastic condition for securing the best results, although it may for some purposes be subsequently worked into compounds containing other materials, and somewhat after the manner of working crude rubber. The method described of compounding and applying these compounds constitutes the subject of a separate application for Letters Patent. (See Serial No. 384,645, filed March 11, 1891.) The vulcanized compound thus produced in bulk is dark colored, frequently very black, quite heavy and solid, quite tenacious in its elasticity, but slowly resilient, and as a rule is almost absolutely odorless. When applied to sheeted fabrics, in its plastic condition, it is, as a rule, essential that the coated surfaces be well stripped, and dusted during the compression of the fabric, as by passing it between cool or slightly heated rolls or scrapers.

It is to be understood that my compound may be developed by modes of procedure other than those indicated, without departure from my invention. As, for instance, if the compound is to be vulcanized after its application to objects of which it is to form a permanent part, and which may be safely exposed to the requisite heat, I proceed as follows: After melting the two main components, I add thereto, one-half the usual charge of sulphur, and subject the mass to less heat, and for a shorter time than by the method before described, the object being to develop the mass into one, which after it has cooled, may at any time be ground, or triturated with powdered sulphur, in weight equal to or a little greater, than that initially employed, and then after application to the cavities or surfaces of the objects to be treated, subjecting the whole to proper heat, say from 350° to 400° Fahrenheit within a suitable chamber or retort, until the final vulcanization is completed, and in such cases, the compound will be improved by the addition thereto, during trituration, of small quantities of litharge, or zinc oxide, as well as other of the well known ingredients employed in vulcanizable rubber compounds.

One of the most valuable uses to which my vulcanized compound may be applied, is in the production of a paint, admirably suited for insulation, in any of the various connections whether electric or thermal, or with respect of moisture, and said compound, carried by or with a suitable vehicle, or solvent, will be made the subject of a separate application for Letters Patent. (See Serial No. 384,648, filed March 11, 1891.) In this latter connection, I will state that when the main elements of my compound have been worked, with a small proportion of sulphur, and imperfectly vulcanized, the resulting mass may be formed into a thick heavy solution, as with the light oils from coal tar, and bi-sulphide of carbon for instance, and a proper proportion of flour of sulphur added, say from two to four per cent., with or without metallic oxides, such as lead and zinc, and then after applying two or more coatings thereof to the surfaces of cloth, or metal, the coatings of compound may be vulcanized by the slow application of heat, up to say from 350° to 400° Fahrenheit, and kept at that temperature for from say fifteen to sixty minutes, and sometimes longer, and then allowed to cool gradually.

My compounds may also be used in forming hard vulcanized compounds, as set forth in an application for patent relating thereto. (See Serial No. 384,825, filed March 12, 1891.)

Sheeted fabrics, whether of the woven or felted types, or paper coated, charged, or combined with my vulcanized compound, constitute valuable features of my invention, and will be made the subject of a separate application for Letters Patent. (See Serial No. 384,824, filed March 12, 1891.)

Used in combination with electric wires jacketed with fibrous material, my compound constitutes an insulating material of great value, quite equal to vulcanized gum compounds, and such wires will constitute the subject of a separate application for Letters Patent. (See Serial No. 384,826, filed March 12, 1891.)

It will readily be seen, that the proportion of sulphur to the mass, may be quite widely varied. As a rule six per cent. in weight need never be exceeded, and if more than eight or ten per cent. be used, much of it will serve no good purpose, and cause efflorescence in the vulcanized compound. In the production of the vulcanized compound for use in paints, as low as two per cent. of the sulphur is sometimes used by me, but as a rule, the best results will be attained by the use of about six per cent., with a preference generally for a lesser proportion than a greater.

Having thus described my invention, I claim as new and desire to secure by Letters Patent—

1. A vulcanizable compound, substantially as hereinbefore described, consisting of such plastic matter as the residual products from the distillation of petroleum, and animal fat candle tar, in proportions which will secure desired strength, and elasticity in the compound after vulcanization, and sulphur in such proportions as will insure vulcanization.

2. The vulcanizable compound hereinbefore described, composed of substantially equal parts of animal fat candle tar, and a residual product from petroleum distillation, and sulphur, in proportions of from two to eight per cent. of the mass.

WILLIAM GRISCOM, Jr.

Witnesses:
    PHILIP F. LARNER,
    HOWELL BARTLE.